US012600254B2

(12) United States Patent
Choi et al.

(10) Patent No.: US 12,600,254 B2
(45) Date of Patent: Apr. 14, 2026

(54) SOLAR CHARGING SYSTEM FOR VEHICLE

(71) Applicants: HYUNDAI MOTOR COMPANY, Seoul (KR); KIA CORPORATION, Seoul (KR); INCHEON NATIONAL UNIVERSITY RESEARCH & BUSINESS FOUNDATION, Incheon (KR)

(72) Inventors: Jaehyuk Choi, Seoul (KR); Byeong Seob Song, Suwon-si (KR); Haeyoon Jung, Seongnam-si (KR); Hyun-Wook Seong, Hwaseong-si (KR); Youngjin Jang, Seoul (KR); Hoyoung Jung, Hwaseong-si (KR); Sung Kyu Kim, Bucheon-si (KR); Sungyong Park, Seoul (KR); Han-Shin Youn, Incheon (KR); Dong-In Lee, Incheon (KR); Sang-Min Kim, Incheon (KR); Sang-Hyuk Hong, Incheon (KR)

(73) Assignees: HYUNDAI MOTOR COMPANY, Seoul (KR); KIA CORPORATION, Seoul (KR); INCHEON NATIONAL UNIVERSITY RESEARCH & BUSINESS FOUNDATION, Incheon (KR)

( * ) Notice: Subject to any disclaimer, the term of this patent is extended or adjusted under 35 U.S.C. 154(b) by 1024 days.

(21) Appl. No.: 17/729,383

(22) Filed: Apr. 26, 2022

(65) Prior Publication Data

US 2022/0388415 A1 Dec. 8, 2022

(30) Foreign Application Priority Data

Jun. 7, 2021 (KR) ........................ 10-2021-0073200

(51) Int. Cl.
*B60L 53/51* (2019.01)
*H02M 3/335* (2006.01)
(52) U.S. Cl.
CPC ......... *B60L 53/51* (2019.02); *H02M 3/33507* (2013.01); *B60L 2210/10* (2013.01)
(58) Field of Classification Search
CPC ...................................................... B60L 53/51
USPC ........................................................ 320/101
See application file for complete search history.

(56) References Cited

U.S. PATENT DOCUMENTS

2017/0063094 A1* 3/2017 Chapman .................. H02J 3/46
2018/0297476 A1* 10/2018 Malek ..................... B60L 1/003

FOREIGN PATENT DOCUMENTS

KR 10-2094440 B1 3/2020

* cited by examiner

*Primary Examiner* — Eric D Lee
(74) *Attorney, Agent, or Firm* — MCDONNELL BOEHNEN HULBERT & BERGHOFF LLP

(57) ABSTRACT

A solar charging system for the vehicle includes a first photovoltaic (PV) module, a second PV module serially connected to the first PV module, and a differential power processing (DPP) transformer that converts power generated from the first PV module and the second PV module by using a magnetic body having a multi-winding structure.

18 Claims, 12 Drawing Sheets

<u>2</u>

<u>2</u>

$N_{P1}{:}N_{P2}{:}N_S$
$= 1{:}1{:}1$

<u>2</u>

2

<u>2</u>

$\underline{2}$

SOLAR CHARGING SYSTEM FOR VEHICLE

CROSS REFERENCE TO RELATED APPLICATIONS

This application claims priority to and the benefit of Korean Patent Application No. 10-2021-0073200 filed in the Korean Intellectual Property Office on Jun. 7, 2021, the entire contents of which are incorporated herein by reference.

BACKGROUND

(a) Field of the Disclosure

The present disclosure relates to a solar charging system for a vehicle.

(b) Description of the Related Art

A solar charging system (or solar system) is applied to an environmentally-friendly vehicle, for example, a solar battery (or solar cell) is mounted on a roof of a vehicle body, and a battery of the environmentally-friendly vehicle is charged by using the solar battery, and accordingly, fuel efficiency may be improved. Particular, in recent years, a solar system market is growing, such as development of transmissive solar cells, and studies for applying a large-capacity solar cell to a bus. Generally, a solar system may include a solar panel that includes a plurality of cell modules (or photovoltaic (PV) modules), a controller that performs maximum power point tracking (MPPT) control and transforms a voltage, and a battery that stores solar energy converted by the solar panel.

However, an imbalance of power generation may occur between the plurality of PV modules. Specifically, some of the plurality of PV modules may be positioned in a shaded or polluted environment to not receive sufficient sunlight or may have poor output compared with other PV modules due to aging or malfunction. In this case, since the plurality of PV modules in the solar system are connected in series with each other, an output current of the entire solar system is limited by an output current value of a PV module with minimum output, so the output of the entire solar system may be deteriorated and productivity thereof may be deteriorated. Therefore, research for compensating for the imbalance of power generation between the plurality of PV modules is being actively conducted.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a solar charging system for a vehicle that may compensate for an imbalance of power generation between a plurality of PV modules and realize down-sizing of a transformer.

An embodiment of the present disclosure provides a solar charging system for a vehicle, including a first photovoltaic (PV) module, a second PV module serially connected to the first PV module, and a differential power processing (DPP) transformer that converts power generated from the first PV module and the second PV module by using a magnetic body having a multi-winding structure.

The DPP transformer may include a plurality of primary side switches disposed and operated between the first PV module and the second PV module, and the magnetic body, and one secondary side switch disposed and operated between the magnetic body and a battery.

The plurality of primary side switches may be turned off while the one secondary side switch is turned on, and the one secondary side switch may be turned off while the plurality of primary side switches are turned on.

When an amount of power generation of the first PV module is larger than that of the second PV module, while the plurality of primary side switches are turned on, a positive voltage may be applied to a leakage inductance of a first winding corresponding to the first PV module, and a negative voltage may be applied to a leakage inductance of a second winding corresponding to the second PV module.

While the plurality of primary side switches are turned on, a magnetizing current may increase with a first slope.

While the plurality of primary side switches are turned on, a first leakage current corresponding to the first PV module may increase with a second slope that is larger than the first slope.

While the plurality of primary side switches are turned on, a second leakage current corresponding to the second PV module may decrease with a third slope.

While the one secondary side switch is turned on, a magnetizing current may decrease, so that a value of the magnetizing current may be changed from positive to negative.

The DPP transformer may include a flyback DPP transformer.

The solar charging system may further include a controller that charges a battery with power generated from the first PV module and the second PV module by performing maximum power point tracking (MPPT) control.

Another embodiment of the present disclosure provides a solar charging system for a vehicle, including a first PV module, a second PV module serially connected to the first PV module, one integrated transformer directly connected to the first PV module and the second PV module to receive a surplus current from the first PV module and provide a supplemental current corresponding to the surplus current to the second PV module, and a single controller that is electrically connected to both ends of the one integrated transformer and performs MPPT control to control output of the integrated transformer to charge a battery.

The one integrated transformer may include one integrated magnetic body provided with a first winding corresponding to the first PV module, a second winding corresponding to the second PV module, and a third winding corresponding to the battery.

A ratio of the first winding, the second winding, and the third winding may be 1:1:1.

The one integrated transformer may includes a plurality of primary side switches disposed and operated between the first PV module and the second PV module, and the magnetic body, and one secondary side switch disposed and operated between the magnetic body and a battery.

The plurality of primary side switches may be turned off while the one secondary side switch is turned on, and the one secondary side switch may be turned off while the plurality of primary side switches are turned on.

While the plurality of primary side switches are turned on, a magnetizing current may increase with a first slope.

While the plurality of primary side switches are turned on, a first leakage current corresponding to the first PV module may increase with a second slope that is larger than the first slope.

While the plurality of primary side switches are turned on, a second leakage current corresponding to the second PV module may decrease with a third slope.

While the one secondary side switch is turned on, a magnetizing current may decrease, so that a value of the magnetizing current may be changed from positive to negative.

While the magnetizing current has a negative value, the plurality of primary side switches may be turned on.

According to the embodiments of the present disclosure, in order to compensate for the imbalance of power generation between the plurality of PV modules, since only one transformer and one secondary side switch using an integrated magnetic material are required, it is possible to realize imbalance compensation by using only a small number of elements compared with the conventional structure using the transformers and the secondary-side switches of as much as the number of PV modules.

In addition, since only one transformer is used, considering that a controller for each transformer is generally required, compared with the conventional method in which transformers are required of as many as the number of PV modules and controllers are also required of as many as the number corresponding thereto, imbalance compensation may be achieved by using only one controller.

In addition, since there is no offset of a magnetizing current, it is possible to realize a simple structure, high density, and down-sizing despite having a multi-winding structure.

DETAILED DESCRIPTION

Figure 1:
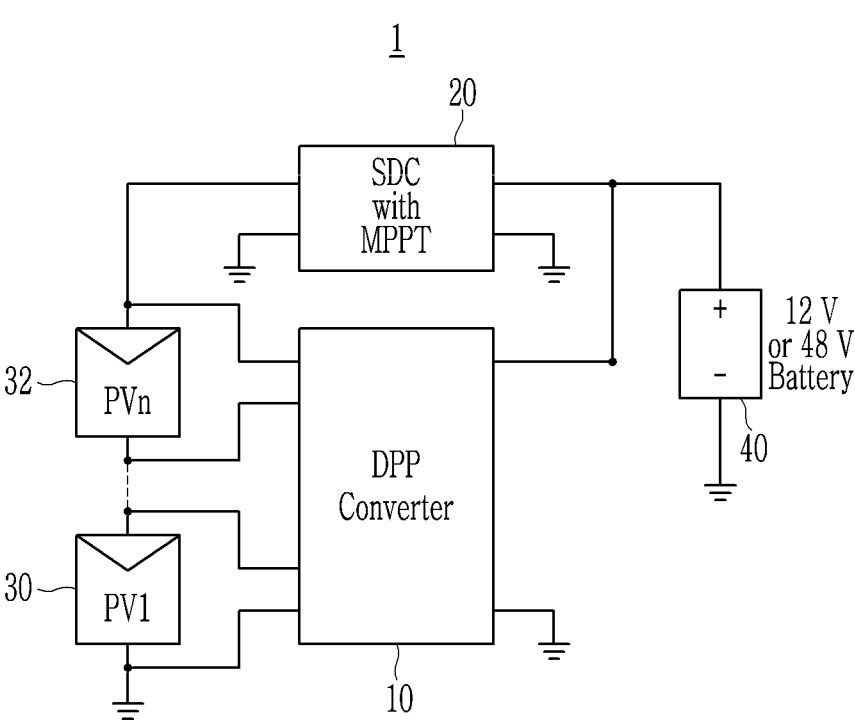
FIG. 1 is a drawing for explaining a solar charging system for a vehicle according to an embodiment of the present disclosure.

Hereinafter, embodiments disclosed in the present specification will be described in detail with reference to the accompanying drawings, and in the present specification, the same or similar constituent elements will be denoted by the same or similar reference numerals, and a redundant description thereof will be omitted. The terms "module" and/or "unit, portion, or part" representing a constituent element used in the following description are used only in order to make understanding of the specification easier, and thus, these terms do not have meanings or roles that distinguish them from each other by themselves. In addition, in describing embodiments of the present specification, when it is determined that a detailed description of the well-known art associated with the present disclosure may obscure the gist of the present disclosure, it will be omitted. Further, the accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

FIG. 1 is a drawing for explaining a solar charging system for a vehicle according to an embodiment of the present disclosure.

Referring to FIG. 1, a solar charging system 1 for a vehicle according to an embodiment of the present disclosure may include a DPP transformer 10, a controller 20, a plurality of PV modules 30 and 32, and a battery 40. Here, the solar charging system 1 for the vehicle is mounted on an environmentally-friendly vehicle, so that fuel efficiency may be improved by storing solar energy converted through a solar panel in the battery 40.

The DPP transformer 10 may be electrically connected to the plurality of PV modules 30 and 32 to control a power conversion operation of the plurality of PV modules 30 and 32. In the present embodiment, the DPP transformer 10 may include a flyback DPP transformer, but the present disclosure is not limited thereto, and the DPP transformer 10 may include any DC-DC converter that is bidirectional and is electrically isolated.

The controller 20 may control output of the DPP transformer 10. The controller 20 may perform MPPT control to control generated power of the plurality of PV modules 30 and 32. Specifically, the controller 20 performs MPPT control to output maximum power from the plurality of PV modules 30 and 32 according to a predetermined MPPT algorithm by using an output voltage and current of the plurality of PV modules 30 and 32, and for this purpose, it may control output and operation of the DPP transformer 10. In the present embodiment, the controller 20 may be implemented as a solar DC (SDC) transformer, but the present disclosure is not limited thereto.

The plurality of PV modules 30 and 32 may configure a solar panel, and may convert solar energy into electrical energy. The solar panel may be installed on a roof of a vehicle, but the present disclosure is not limited thereto, and any area on which the solar panel may be installed, such as a door, a lid, and a bonnet, may be installed. The PV module is a solar cell, and an amorphous silicon solar cell or a crystalline silicon solar cell may be used as the solar cell, and in particular, a dye-sensitized solar cell, a perovskite-based solar cell, an organic solar cell, a cadmium-tellurium (CdTe)-based solar cell, copper-indium-gallium-selenium (CIGS) solar cell, and the like may be used individually or in combination.

In the present embodiment, the plurality of PV modules 30 and 32 may be connected in series. That is, the solar charging system 1 for the vehicle includes a first PV module 30 and a second PV module 32, and the second PV module 32 may be serially connected to the first PV module 30. In addition, the DPP transformer 10 is electrically connected to both the first PV module 30 and the second PV module 32, and converts power generated from the first PV module 30 and the second PV module 32, and for this purpose, a magnetic body having a multi-winding structure may be used.

Figure 2:
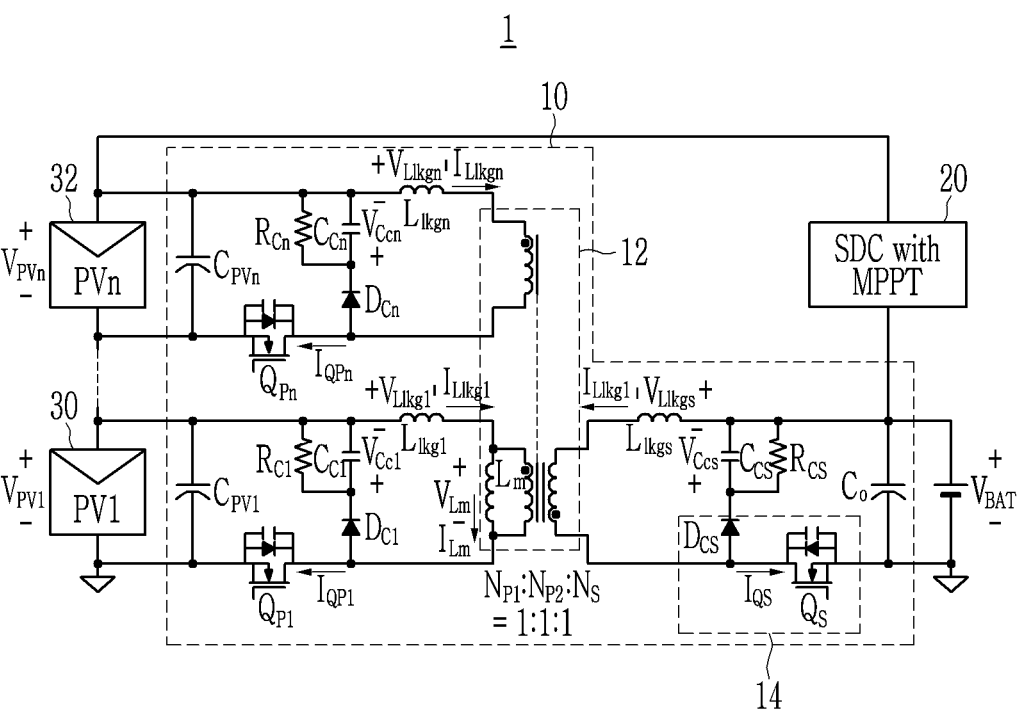
FIG. 2 is a circuit diagram for explaining a solar charging system for a vehicle according to an embodiment of the present disclosure.
Figure 3:
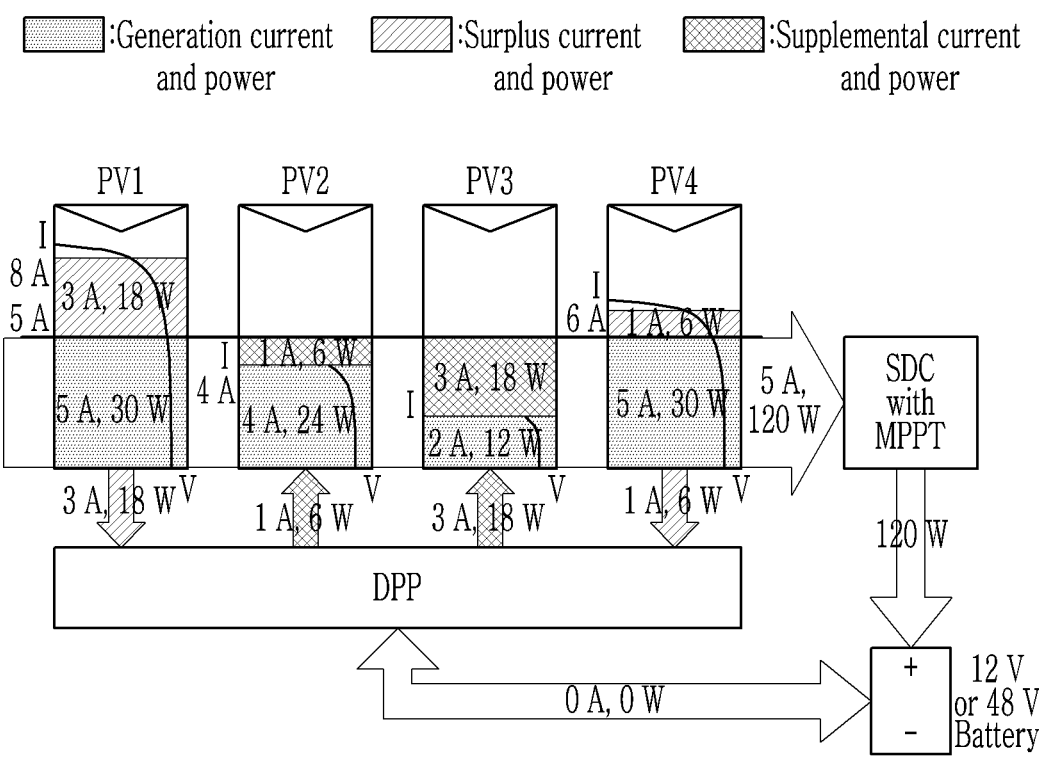
FIG. 3 is a drawing for explaining that a solar charging system for a vehicle according to an embodiment of the present disclosure compensates for imbalance of power generation between a plurality of PV modules.

FIG. 2 is a circuit diagram for explaining a solar charging system for a vehicle according to an embodiment of the present disclosure, and FIG. 3 is a drawing for explaining that a solar charging system for a vehicle according to an embodiment of the present disclosure compensates for imbalance of power generation between a plurality of PV modules.

Referring to FIG. 2, the solar charging system 1 for the vehicle may include the DPP transformer 10, the controller 20, and the plurality of PV modules 30 and 32, and the DPP transformer 10 may include a magnetic body 12 and a secondary side switch circuit 14.

The magnetic body 12 may be implemented so that a ratio of a first winding corresponding to the first PV module 30, a second winding corresponding to the second PV module 32, and a third winding corresponding to the secondary side switch circuit 14 is as follows.

$$N_{P1}:N_{P2}:N_S=1:1:1$$

Here, $N_{P1}$ represents the first winding, $N_{P2}$ represents the second winding, and $N_S$ represents the third winding.

The magnetic body 12 having such a turn ratio and implemented to have the structure of FIG. 2 may be referred to as an "integrated magnetic body".

Conventionally, for maximum output operation or output imbalance compensation for each of N (hereinafter, N is an integer of 2 or more) PV modules, N DPP transformers are connected in parallel to each of N PV modules connected in series, so that MPPT operation is performed for each PV module by using each DPP transformer, and for bidirectional power transmission and isolation, a bidirectional flyback transformer is used as the DPP transformer.

In the above-described configuration, N DPP transformers, N primary-side switches, and N secondary-side switches are required, and 2N driving circuits are required to drive each switch, and due to characteristics of a flyback transformer, an offset of a magnetizing current exists, which increases a volume of the transformer, and since the N DPP transformers must be individually controlled, N controllers are required and implementation complexity of a control method thereof increases. Accordingly, in the conventional method, the number of elements used to compensate the imbalance is large, so a cost is high, price competitiveness is low, and it is difficult to miniaturize it due to a large volume thereof.

However, in the present embodiment, a primary side has a multi-winding structure and adopts an integrated magnetic body of a form integrated with a secondary side winding, and a secondary side switch circuit 14 including only one secondary side switch (QS) is adopted, thereby realizing imbalance compensation by using only a small number of elements compared with the conventional structure described above.

Specifically, since it requires only one transformer 10 and one secondary-side switch QS using the integrated magnetic body 12 to compensate for the imbalance of power generation between the plurality of PV modules 30 and 32, it is possible to realize imbalance compensation by using only a small number of elements compared with the conventional structure using the transformers and the secondary-side switches of as many as the number of PV modules.

In addition, since only one transformer 10 is used, considering that a controller for each transformer is generally required, compared with the conventional method in which transformers are required of as many as the number of PV modules and controllers are also required of as many as the number corresponding thereto, imbalance compensation may be achieved by using only one controller 20.

In this structure, a surplus current and power from the PV module 30 to the DPP transformer 10 is directed from the DPP transformer 10 to the PV module 32 as a supplemental current and power, and as a result, it circulates only in the primary side of the DPP transformer 10, and an average current of the secondary side thereof becomes zero.

Referring to FIG. 3 together therewith, as a surplus current and power (3 A and 18 W) from a PV module PV1 and a surplus current and power (1 A and 6 W) from a PV module PV4 are directed to the DPP transformer, a supplemental current and power (1 A and 6 W) from the DPP transformer are directed to a PV module PV2, and a supplemental current and power (3 A and 18 W) are directed towards a PV module PV3, despite the PV module PV2 that outputs the generation current and power (4 A and 24 W) and the PV module PV3 that outputs the generation current and power (2 A and 12 W), imbalance of outputs of the series-connected PV modules PV1 to PV4 to each other may be compensated with the output current and power (5 A and 120 W).

In addition, since there is no offset of a magnetizing current, it is possible to realize a simple structure, high density, and down-sizing despite having a multi-winding structure.

In addition, soft switching of the primary side switch is possible, and the structure of the transformer 10 may be simplified due to the simplification of the secondary side, thereby achieving high density.

Figure 4:
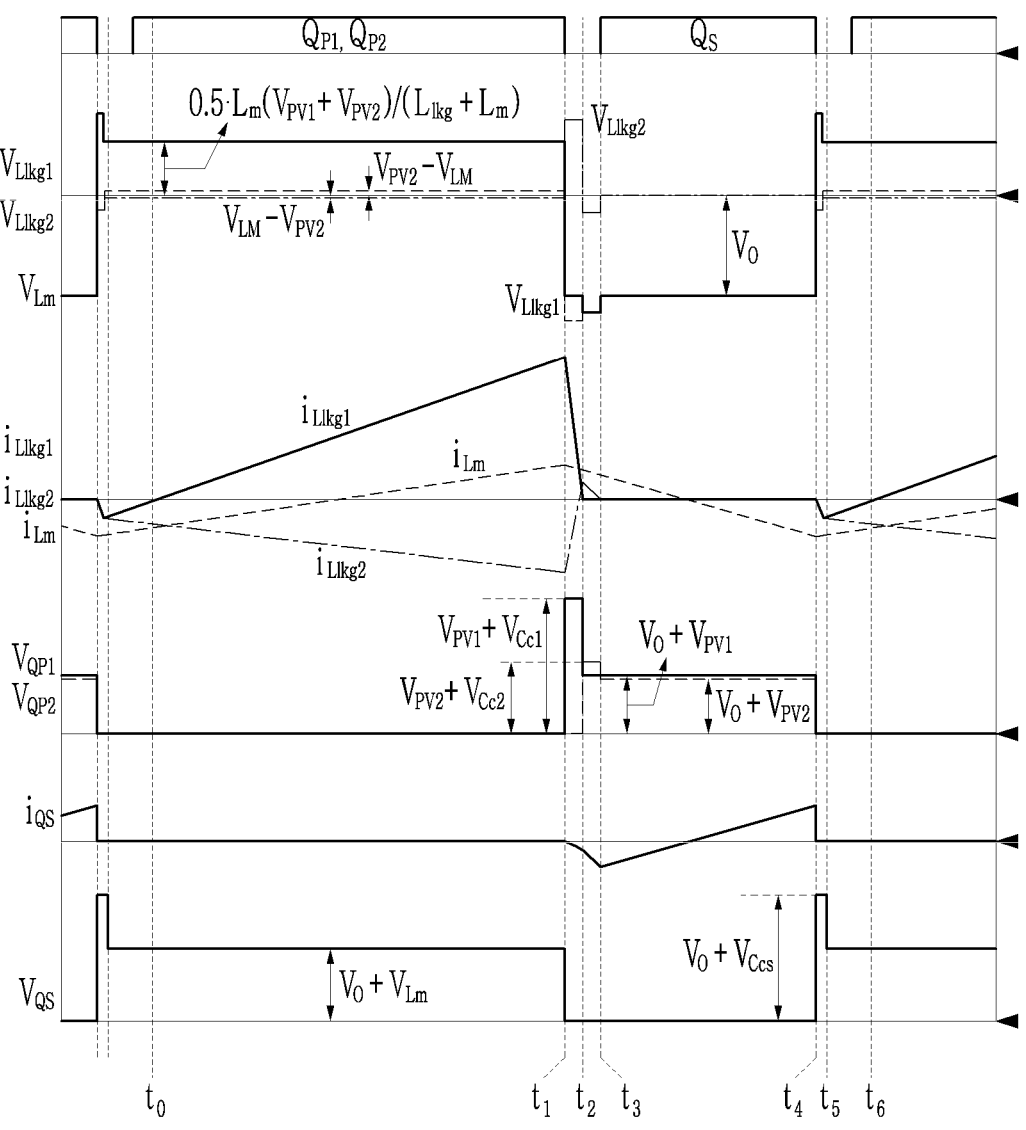
FIG. 4 is a timing diagram for explaining an operation of a solar charging system for a vehicle according to an embodiment of the present disclosure.

FIG. 4 is a timing diagram for explaining an operation of a solar charging system for a vehicle according to an embodiment of the present disclosure, and FIG. 5 to FIG. 10 are circuit diagrams for explaining an operation of a solar charging system for a vehicle according to an embodiment of the present disclosure.

Figure 5:
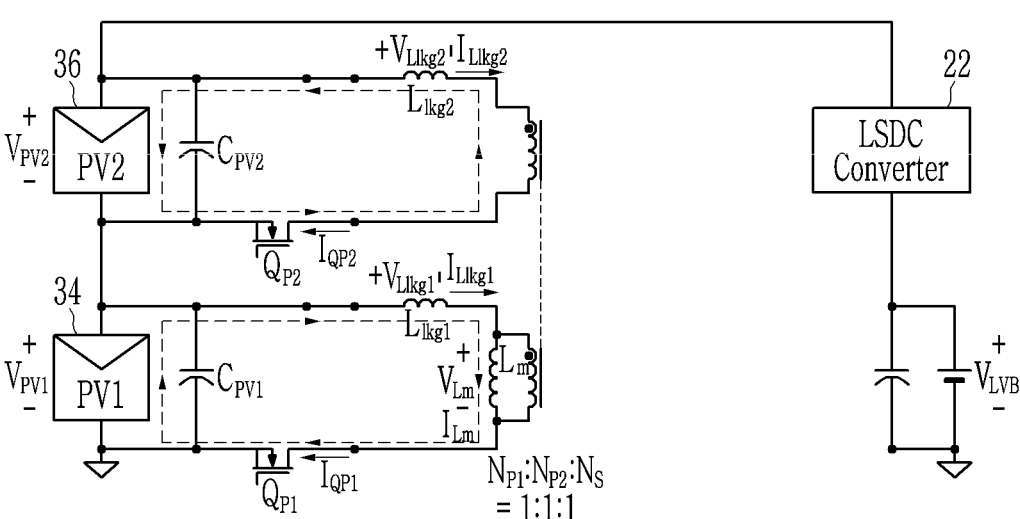
FIGS. 5, 6, 7, 8, 9, and 10 are circuit diagrams for explaining an operation of a solar charging system for a vehicle according to an embodiment of the present disclosure.
Figure 6:
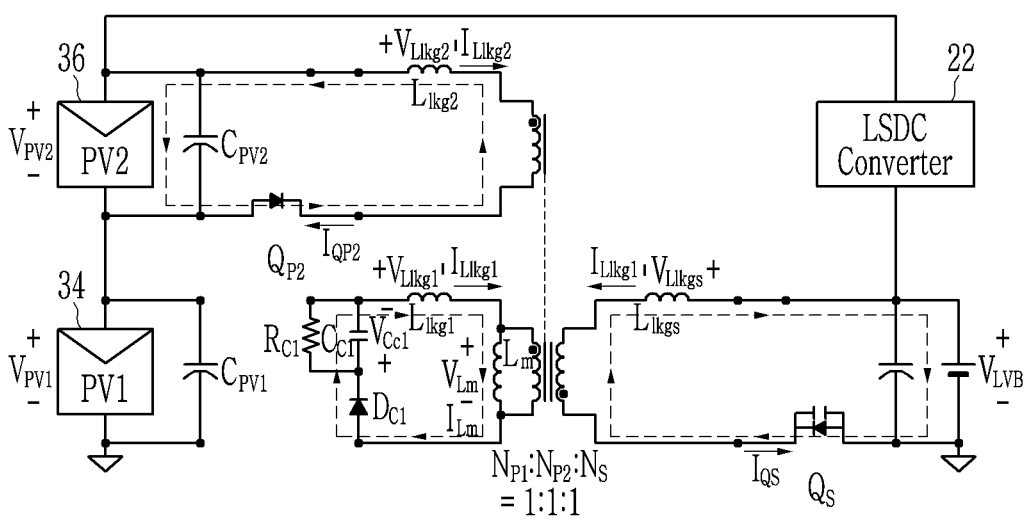

Specifically, FIG. 5 illustrates an operation in a section between a time point $t_0$ and a time point $t_1$ in FIG. 4, and FIG. 6 illustrates an operation in a section between the time point $t_1$ and a time point $t_2$ in FIG. 4. In addition, FIG. 7 to FIG. 10 illustrate operations in a section between the time point $t_2$ and a time point $t_3$, in a section between the time point $t_3$ and a time point $t_4$, in a section between the time point $t_4$ and a time point $t_5$, and in a section between the time point $t_5$ and a time point $t_6$, in FIG. 4, respectively.

A solar charging system 2 for a vehicle according to an embodiment of the present disclosure, which is described with reference to FIG. 4 to FIG. 10, includes a DPP transformer, a controller 22, a first PV module 34, and a second PV module 36, and the DPP transformer includes a plurality of primary side switches $Q_{P1}$ and $Q_{P2}$ disposed and operated between the PV module 34 and the second PV module 36, and a magnetic body, and one secondary switch $Q_S$ disposed and operated between the magnetic body and a battery. In the solar charging system 2 for the vehicle, for convenience and clarity of explanation, a first PV module 34 and a second PV module 36 are connected in series, and it is assumed that an amount of the power generation of the first PV module 34 is larger than that of the second PV module 36.

In the solar charging system 2 for the vehicle, the plurality of primary side switches $Q_{P1}$ and $Q_{P2}$ may be turned off while one secondary side switch $Q_S$ is turned on, and one secondary side switch $Q_S$ may be turned off while the plurality of primary side switches $Q_{P1}$ and $Q_{P2}$ are turned on, that is, the plurality of primary side switches $Q_{P1}$ and $Q_{P2}$ and one secondary side switch $Q_S$ may be complementarily operated. Meanwhile, the plurality of primary side switches $Q_{P1}$ and $Q_{P2}$ may be turned on simultaneously or turned off simultaneously.

The plurality of primary side switches $Q_{P1}$ and $Q_{P2}$ may be driven by one pulse width modulation (PWM) signal, and since one secondary side switch $Q_S$ is complementarily driven with the plurality of primary side switches $Q_{P1}$ and $Q_{P2}$, it is possible to compensate the imbalance of the PV modules with one controller.

Referring to FIG. 4 and FIG. 5 together, in the section between the time point $t_0$ and the time point $t_1$, the plurality of primary switches $Q_{P1}$ and $Q_{P2}$ are turned on. In addition, since the amount of power generation of the first PV module 34 is larger than that of the second PV module 36, a voltage $V_{PV1}$ of the first PV module 34 is higher than a voltage $V_{PV2}$ of the second PV module 36. Accordingly, a voltage $V_{Lm}$ applied to a magnetizing inductor of the transformer has a value between the voltage $V_{PV1}$ and the voltage $V_{PV2}$, and a magnetizing current (or magnetizing inductance current) $i_{Lm}$ increases. Particularly, as shown in FIG. 4, while the plurality of primary side switches $Q_{P1}$ and $Q_{P2}$ are turned on, the magnetizing current $i_{Lm}$ may increase with a first slope.

A positive voltage ($V_{PV1}-V_{Lm}$) is applied to a leakage inductance $L_{lkg1}$ of a first winding $N_{P1}$ corresponding to the first PV module 34, so that a first leakage current $i_{Llkg1}$ of the leakage inductance $L_{lkg1}$ increases, and a negative voltage ($V_{PV2}-V_{Lm}$) is applied to a leakage inductance $L_{lkg2}$ of a second winding $N_{P2}$ corresponding to the second PV module 36, so that a second leakage current $i_{Llkg2}$ of the leakage inductance $L_{lkg2}$ decreases. Particularly, as shown in FIG. 4, while the plurality of primary side switches $Q_{P1}$ and $Q_{P2}$ are turned on, the first leakage current $i_{llkg1}$ corresponding to the first PV module 34 may increase with a second slope that is larger than the first slope. In addition, while the plurality of primary side switches $Q_{P1}$ and $Q_{P2}$ are turned on, the second leakage current $i_{Llkg2}$ corresponding to the second PV module 36 may decrease with a third slope.

In this case, since the first winding $N_{P1}$ and second winding $N_{P2}$ of the transformer are coupled, the second leakage current $i_{Llkg2}$ is as follows.

$$i_{Llkg2}=-(i_{Llkg1}-i_{Lm})$$

This indicates that the surplus current from the first PV module 34 flows into the second PV module 36 to compensate for the imbalance of the power generation between the PV modules 34 and 36.

Next, referring to FIG. 4 and FIG. 6 together, in the section between the time point $t_1$ and the time $t_2$, the plurality of primary side switches $Q_{P1}$ and $Q_{P2}$ are turned off, and a body diode of one secondary side switch $Q_S$ is turned on.

In this case, energy stored in the leakage inductance $L_{lkg1}$ is consumed through an RCD snubber, and energy stored in the leakage inductance $L_{lkg2}$ is discharged to the second PV module 36. In addition, an output voltage ($-N_{P1}/N_S \cdot V_O$) projected to the primary side is applied to the inductance Lm, and a magnetizing current $i_{Lm}$ starts to decrease. Here, the $N_{P1}$ is the first winding corresponding to the first PV module 34, the $N_S$ is the third winding (that is, secondary side winding) corresponding to one secondary side switch $Q_S$, and the $V_O$ is an output voltage.

Figure 7:
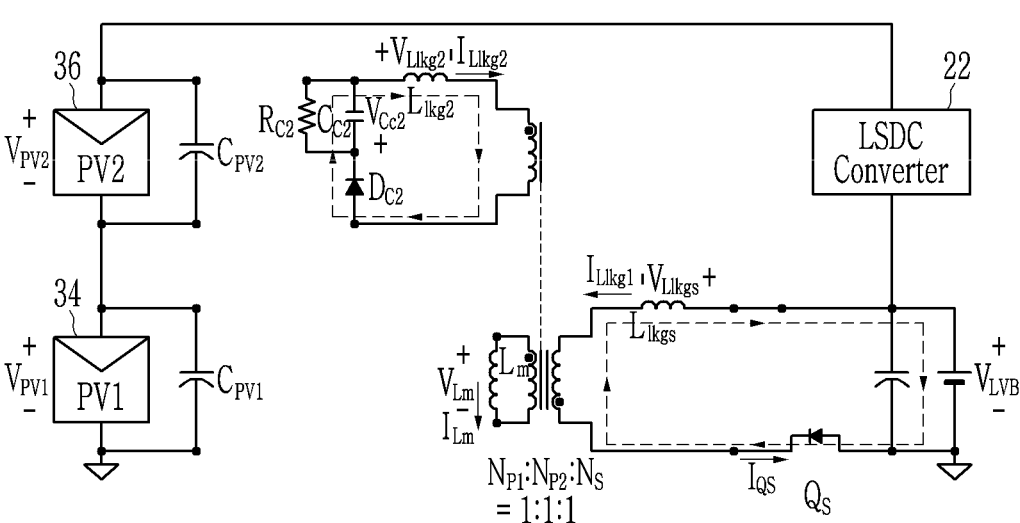

Next, referring to FIG. 4 and FIG. 7 together, the section between the time point $t_2$ and the time point $t_3$ starts after the discharge of the leakage inductance $L_{lkg1}$ is completed. In the corresponding section, the plurality of primary side switches $Q_{P1}$ and $Q_{P2}$ are maintained in a turned-off state, and the body diode of one secondary side switch $Q_S$ is maintained in a conductive state.

In this case, the energy stored in the leakage inductance $L_{lkg2}$ is consumed through the RCD snubber, and a voltage ($-N_{P1}/N_S \cdot V_O$) is applied to the inductance $L_m$, thereby reducing the magnetizing current $i_{Lm}$.

Figure 8:
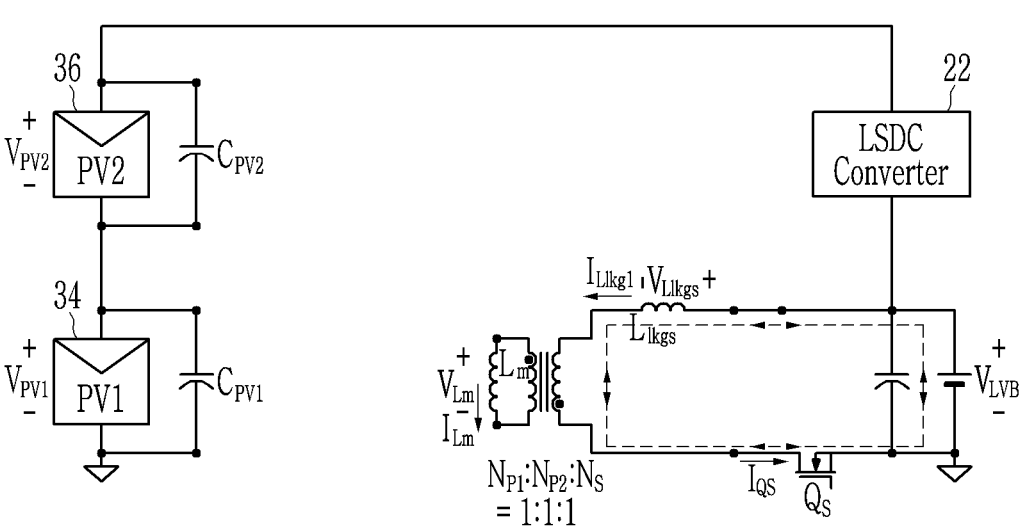

Referring to FIG. 4 and FIG. 8 together, in the section between the time points $t_3$ and $t_4$, one secondary side switch $Q_S$ is turned on.

While one secondary side switch $Q_S$ is turned on, the voltage ($-N_{P1}/N_S \cdot V_O$) is applied to the inductance Lm, so that the magnetizing current $i_{Lm}$ continuously decreases to when its value is changed from positive to negative, and the transformer is reset. Particularly, as shown in FIG. 4, it can be seen that the offset of the magnetizing current $i_{Lm}$ becomes 0 in the corresponding section. As described above, since the offset of the magnetizing current $i_{Lm}$ does not exist, miniaturization of the transformer may be realized, which is in contrast to the conventional flyback DPP transformer in which the offset of the magnetizing current exists and thus the size of the transformer has to be large.

Figure 9:
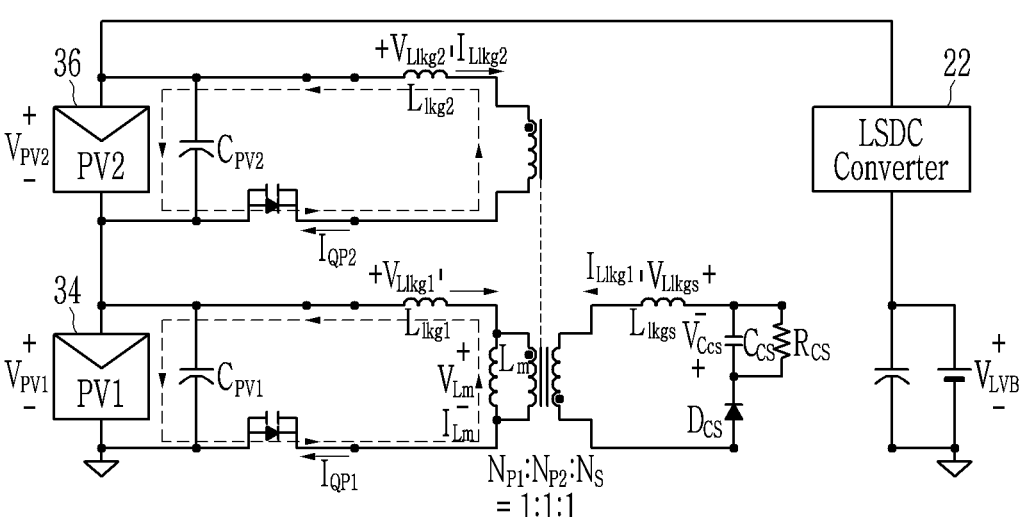

Referring to FIG. 4 and FIG. 9 together, the section between the time points $t_4$ and $t_5$ starts when one secondary side switch $Q_S$ is turned off. In the corresponding section, the energy stored in the leakage inductance $L_{lkgs}$ by the secondary side winding $N_S$ is discharged through the RCD snubber, and the leakage current at this time is projected to the primary side, so that diodes of the plurality of primary side switches $Q_{P1}$ and $Q_{P2}$ are turned on and simultaneously current switching occurs.

Figure 10:
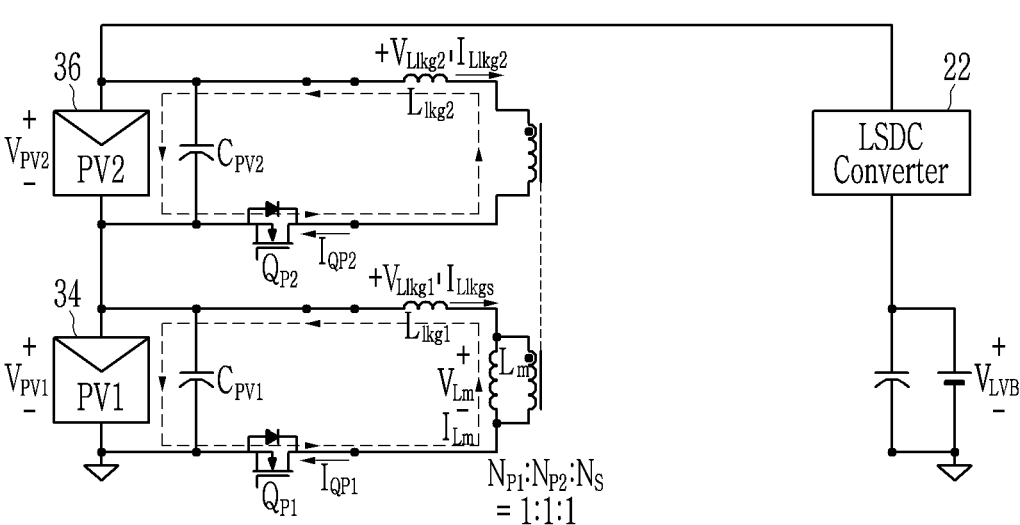

Referring to FIG. 4 and FIG. 10 together, the section between the time points $t_5$ and $t_6$ starts after the primary side current switching is completed, and similar to the section between the time points $t_0$ and $t_1$, a positive voltage ($V_{PV1}-V_{Lm}$) is applied to the leakage inductance $L_{lkg1}$ of the first winding $N_{P1}$ corresponding to the first PV module 34, so that the first leakage current $i_{Llkg1}$ of the leakage inductance $L_{lkg1}$ increases, and a negative voltage ($V_{PV2}-V_{Lm}$) is applied to the leakage inductance $L_{lkg2}$ of the second winding $N_{P2}$ corresponding to the second PV module 36, so that the second leakage current $i_{L lkg2}$ of the leakage inductance $L_{lkg2}$ decreases.

While the first leakage current $i_{L lkg1}$ and the second leakage current $i_{L lkg2}$ have negative values, the plurality of primary side switches $Q_{P1}$ and $Q_{P2}$ are turned on, so that zero voltage switching (ZVS) of the plurality of primary side switches $Q_{P1}$ and $Q_{P2}$ may be realized.

Figure 11:
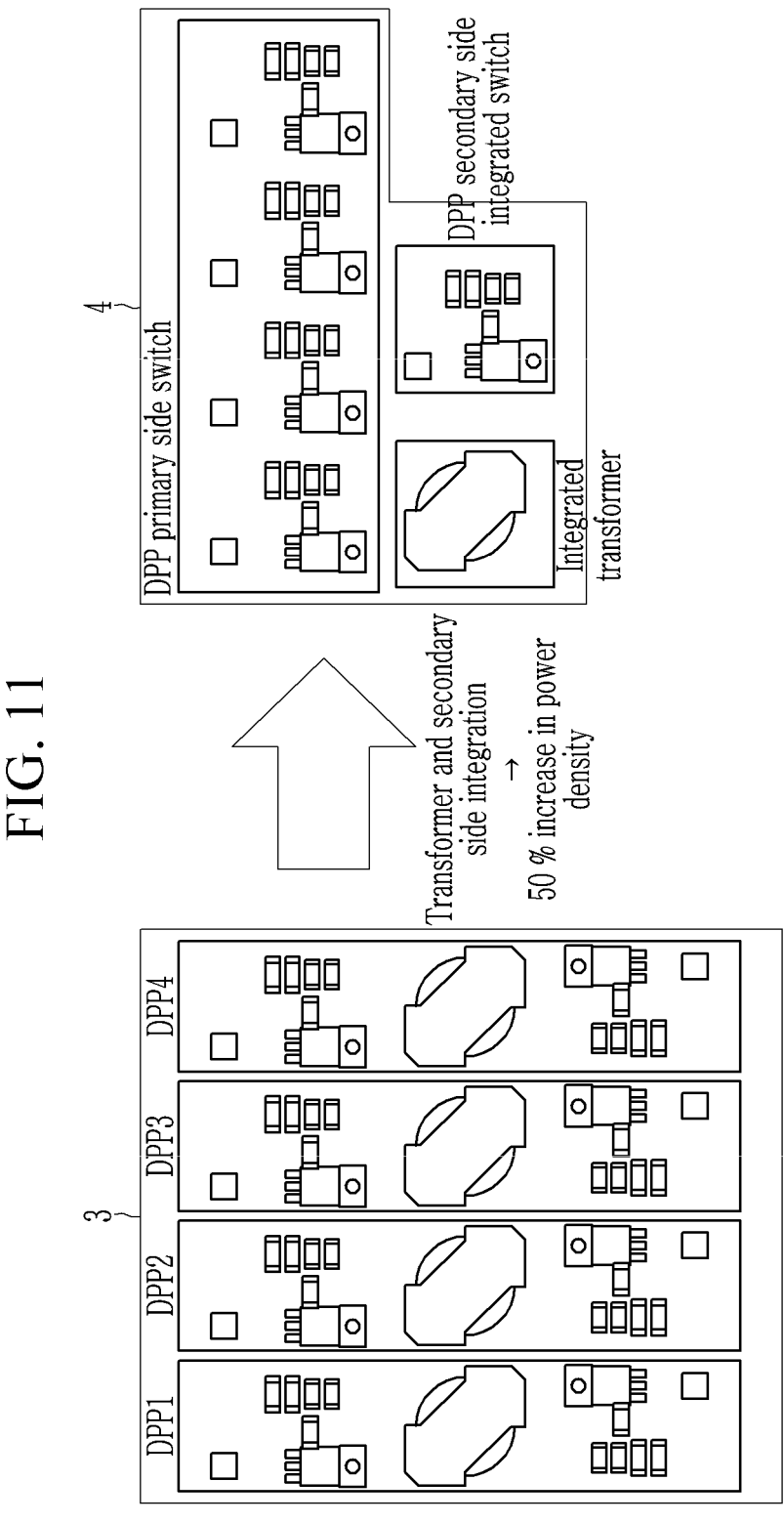
FIG. 11 is a drawing for explaining an implementation example of a solar charging system for a vehicle according to an embodiment of the present disclosure.

FIG. 11 is a drawing for explaining an implementation example of a solar charging system for a vehicle according to an embodiment of the present disclosure.

Referring to FIG. 11, as a structure using only one DPP transformer and one secondary side switch is adopted, it can be seen that the power density is increased by about 50%, compared with the conventional structure using a plurality of DPP transformers and secondary side switches according to the number of PV modules.

For example, assuming there are 4 PV modules, in a conventional solar charging system 3 for a vehicle, 4 DPP transformers, 4 primary side switches, and 4 secondary side switches are used, whereas in a solar charging system 4 for a vehicle according to an embodiment of the present disclosure, since one integrated transformer, 4 primary side switches, and one secondary side switch are used, the number of elements used is reduced and the magnetizing current offset is removed, thereby reducing the occupation volume thereof.

Figure 12:
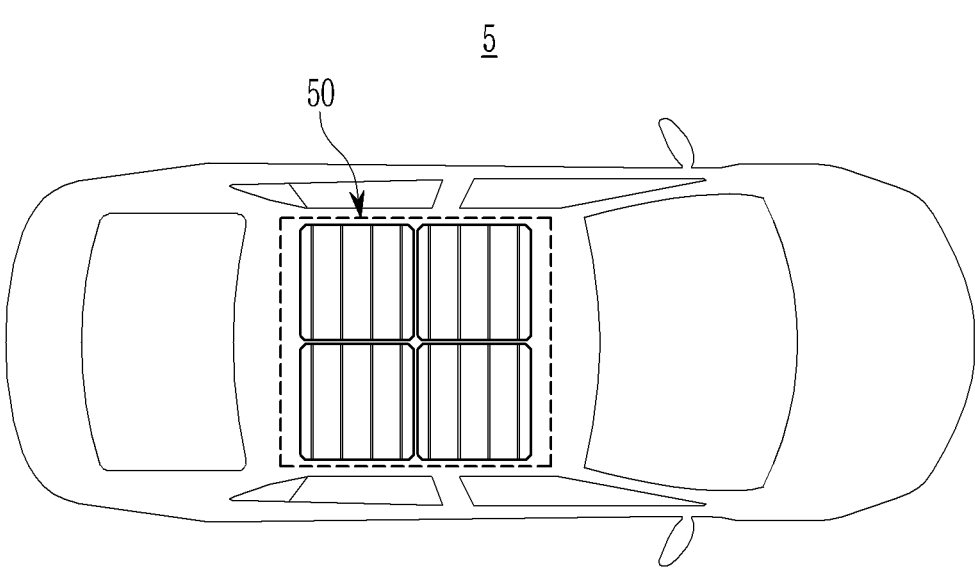
FIG. 12 is a drawing for explaining an implementation example in which a solar charging system for a vehicle according to an embodiment of the present disclosure is applied to an environmentally-friendly vehicle.

FIG. 12 is a drawing for explaining an implementation example in which a solar charging system for a vehicle according to an embodiment of the present disclosure is applied to an environmentally-friendly vehicle.

Referring to FIG. 12, the solar charging system for the vehicle according to the embodiment of the present disclosures may be applied to an environmentally-friendly vehicle 5.

In the present embodiment, a solar panel may be installed on a roof of an environmentally-friendly vehicle 5, the solar panel may include a plurality of PV modules for converting solar energy into electrical energy, and in order to compensate for the imbalance of power generation between the plurality of PV modules, the above-described structure in which only one transformer and one secondary side switch using an integrated magnetic body are included may be used.

According to the embodiments of the present disclosure described so far, in order to compensate for the imbalance of power generation between the plurality of PV modules, since only one transformer and one secondary side switch using an integrated magnetic body are required, it is possible to realize imbalance compensation by using only a small number of elements compared with the conventional structure using the transformers and the secondary-side switches of as many as the number of PV modules.

In addition, since only one transformer is used, considering that a controller for each transformer is generally required, compared with the conventional method in which transformers are required of as many as the number of PV modules and controllers are also required of as many as the number corresponding thereto, imbalance compensation may be achieved by using only one controller.

In addition, since there is no offset of a magnetizing current, it is possible to realize a simple structure, high density, and down-sizing despite having a multi-winding structure.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A solar charging system for a vehicle, comprising:
   a first photovoltaic (PV) module;
   a second PV module serially connected to the first PV module; and
   a differential power processing (DPP) transformer that converts power generated from the first PV module and the second PV module by using a magnetic body having a multi-winding structure,
   wherein the DPP transformer includes a plurality of primary side switches positioned and operated between the first PV module and the second PV module, and the magnetic body, and one secondary side switch positioned and operated between the magnetic body and a battery; and
   wherein the plurality of primary side switches is driven by one pulse width modulation (PWM) signal, and the one secondary side switch is complementarily driven with the plurality of primary side switches.

2. The solar charging system for the vehicle of claim 1, wherein the plurality of primary side switches are turned off while the one secondary side switch is turned on, and the one secondary side switch is turned off while the plurality of primary side switches are turned on.

3. The solar charging system for the vehicle of claim 1, wherein when an amount of power generation of the first PV module is larger than an amount of power generation of the second PV module, while the plurality of primary side switches are turned on, a positive voltage is applied to a leakage inductance of a first winding corresponding to the first PV module, and a negative voltage is applied to a leakage inductance of a second winding corresponding to the second PV module.

4. The solar charging system for the vehicle of claim 3, wherein while the plurality of primary side switches are turned on, a magnetizing current increases with a first slope.

5. The solar charging system for the vehicle of claim 4, wherein while the plurality of primary side switches are turned on, a first leakage current corresponding to the first PV module increases with a second slope that is larger than the first slope.

6. The solar charging system for the vehicle of claim 4, wherein while the plurality of primary side switches are turned on, a second leakage current corresponding to the second PV module decreases with a third slope.

7. The solar charging system for the vehicle of claim 3, wherein while the one secondary side switch is turned on, a magnetizing current decreases, so that a value of the magnetizing current is changed from positive to negative.

8. The solar charging system for the vehicle of claim 1, wherein the DPP transformer includes a flyback DPP transformer.

9. The solar charging system for the vehicle of claim 1, further comprising a controller that charges a battery with power generated from the first PV module and the second PV module by performing maximum power point tracking (MPPT) control.

10. A solar charging system for a vehicle, comprising:
    a first PV module;
    a second PV module serially connected to the first PV module;
    one integrated transformer directly connected to the first PV module and the second PV module to receive a surplus current from the first PV module and provide a supplemental current corresponding to the surplus current to the second PV module; and a single controller that is electrically connected to both ends of the one integrated transformer and performs MPPT control to control output of the integrated transformer to charge a battery, wherein the one integrated transformer includes one integrated magnetic body;

wherein the one integrated transformer includes a plurality of primary side switches positioned and operated between the first PV module and the second PV module, and the one integrated magnetic body, and one secondary side switch positioned and operated between the one integrated magnetic body and a battery; and wherein the plurality of primary side switches is driven by one pulse width modulation (PWM) signal, and the one secondary side switch is complementarily driven with the plurality of primary side switches.

11. The solar charging system for the vehicle of claim 10, wherein the one integrated magnetic body is provided with a first winding corresponding to the first PV module, a second winding corresponding to the second PV module, and a third winding corresponding to the battery.

12. The solar charging system for the vehicle of claim 11, wherein a ratio of the first winding, the second winding, and the third winding is 1:1:1.

13. The solar charging system for the vehicle of claim 10, wherein the plurality of primary side switches are turned off while the one secondary side switch is turned on, and the one secondary side switch is turned off while the plurality of primary side switches are turned on.

14. The solar charging system for the vehicle of claim 13, wherein while the plurality of primary side switches are turned on, a magnetizing current increases with a first slope.

15. The solar charging system for the vehicle of claim 14, wherein while the plurality of primary side switches are turned on, a first leakage current corresponding to the first PV module increases with a second slope that is larger than the first slope.

16. The solar charging system for the vehicle of claim 14, wherein while the plurality of primary side switches are turned on, a second leakage current corresponding to the second PV module decreases with a third slope.

17. The solar charging system for the vehicle of claim 13, wherein while the one secondary side switch is turned on, a magnetizing current decreases, so that a value of the magnetizing current is changed from positive to negative.

18. The solar charging system for the vehicle of claim 17, wherein while the magnetizing current has a negative value, the plurality of primary side switches are turned on.

* * * * *